July 22, 1958 R. C. MIERENDORF ET AL 2,844,709
WELDER CONTROL SYSTEM
Filed Jan. 15, 1954
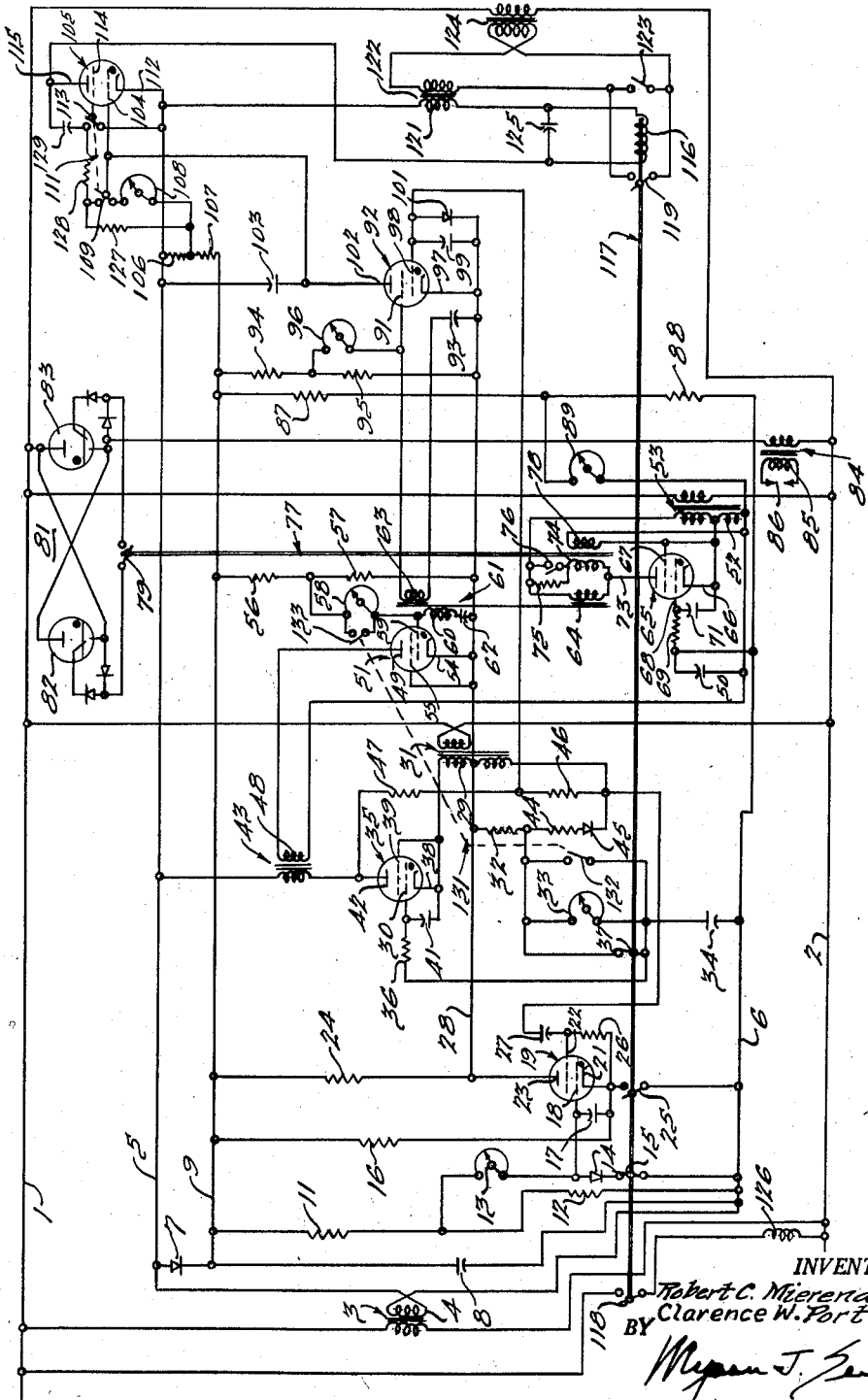
INVENTORS.
Robert C. Mierendorf,
Clarence W. Porter.
BY
ATTORNEY.

United States Patent Office 2,844,709
Patented July 22, 1958

2,844,709
WELDER CONTROL SYSTEM

Robert C. Mierendorf and Clarence W. Porter, Milwaukee, Wis., assignors to Square D Company, Detroit, Mich., a corporation of Michigan Application January 15, 1954, Serial No. 404,370

7 Claims. (Cl. 219—114)

This invention relates to an electronic control system for pulsation welding.

In pulsation welding control the period corresponding to the weld time in a conventional single impulse weld is replaced by a weld interval time within which occur successive heat and cool times making up a multi-impulse weld. The heat time in the weld interval is that period during which the welding current flows for any one impulse. The cool time is that period between successive heat times within the weld interval. Squeeze, hold and off times have the same characteristics as in single impulse welds.

It is an object of this invention to provide electronic control for pulsation welding in which the hold time is an independent timing adjustment and always directly follows a heating time.

Another object of the invention is an electronic control for pulsation welding in which the control grid of the electronic tube initiating hold time is held negative by conduction of the electronic tube controlling the weld interval period.

Another object of the invention is to provide an electronic control for pulsation welders which is fail-safe in that it is unnecessary to fire an electronic tube to stop the welding current at the end of a heat time, the failing of the tube in and of itself preventing the initiation of another heat time.

Other objects and features of the invention will be readily apparent to those skilled in the art from the specification and appended drawing illustrating certain preferred embodiments in which:

The figure is a diagrammatic representation of an electronic control circuit for pulsation welding incorporating this invention.

In the figure, there is disclosed a pair of main supply lines 1 and 2 normally connected to a source of electrical energy. Shown connected between these lines is the primary winding of a transformer 3 having a secondary winding 4 which supplies electrical energy to a pair of secondary supply lines 5 and 6. Connected between lines 5 and 6 are a rectifier 7 and a capacitor 8, a line 9 being connected to the junction between the elements 7 and 8 so that a D. C. voltage appears between the lines 6 and 9.

Serially connected between the lines 6 and 9 are a pair of resistors 11 and 12 and electrically connected to a point intermediate these resistors is one terminal of a rheostat 13. The opposite terminal of the rheostat 13 is connected through a rectifier 14 and normally closed contact 15 to the line 6.

Connected to the line 9 is one side of a resister 16, the opposite side of which is connected to one terminal of a capacitor 17. The opposite side of the the capacitor 17 is electrically connected to the rheostat 13 and rectifier 14 and to the control grid 18 of an electronic tube 19. The tube 19 has a cathode 21, a shield grid 22 and an anode 23. As will be seen in the drawing, the anode 23 of the tube 19 is connected to line 9 through resistor 24. The cathode 21 of tube 19 is connected to capacitor 17 and to the line 6 through normally open contacts 25. Shield grid 22 is connected through resistor 26 to cathode 21 and is also electrically connected through a capacitor 27 to the secondary winding 29 of a synchronizing transformer 31. Electrically connected to the anode 23 of tube 19 is a line 28 which is connected to an intermediate point of the secondary winding 29 of transformer 31, the primary thereof being energized across the lines 1 and 2.

Between lines 6 and 28 are serially connected a resistor 32, a rheostat 33 and a capacitor 34. To the junction between resistor 32 and rheostat 33 is connected a control grid 30 of an electronic tube 35 through a resistor 36 and normally closed contact 37. The cathode 38 of electronic tube 35 is connected to one side of the secondary winding 29. The shield grid 39 of tube 35 is connected to the cathode 38 and the control grid 34 is connected to the cathode 38 through the capacitor 41. The anode 42 of tube 35 is connected to one terminal of the primary winding of a transformer 43, the opposite terminal of which is connected to the line 5.

The midpoint between resistor 32 and rheostat 33 is connected through resistor 44 and rectifier 45 to the terminal of secondary winding 29 opposite the cathode 38 and this terminal is also connected through serially connected resistors 46 and 47 to the anode 42 of tube 35.

The secondary winding 48 of transformer 43 has one terminal connected to the anode 49 of an electronic tube 51, the other terminal of secondary winding 48 being connected through capacitor 50 to line 6. The cathode 54 of tube 51 is connected to the line 28 as is also the screen grid 55. Between lines 9 and 28 are disposed serially connected resistors 56 and 57 and the junction between these resistors is connected through rheostat 58 to the control grid 59 of tube 51 and to one terminal of secondary winding 60 of transformer 61, the other terminal of winding 60 being connected through capacitor 62 to line 28. Transformer 61 is provided with an auxiliary secondary winding 63 and a primary winding 64.

A transformer 53, having its primary energized across lines 1 and 2, provides electrical energy for an electronic tube 65 whose cathode 66 is connected to a point adjacent one end of the secondary winding 52 of transformer 53 and to which is also connected the shield grid 67. Control grid 68 is connected through resistor 69 to capacitor 50 and through capacitor 71 to cathode 66. The anode 73 of tube 65 feeds through the parallel circuit formed by transformer primary 64 and a main relay coil 74, the relay coil being in series with a resistor 75 which may be shunted by a manual switch 76.

The main relay coil 74 forms part of a relay indicated generally at 77 and including an auxiliary holding winding 78 which is shown in the drawing as connected across a minor portion of the secondary winding 52 of transformer 53. The relay 77 controls the operation of normally open contacts 79 disposed to control the passage of current through a conventional back-to-back ignitron contactor indicated generally at 81. The contactor 81 comprises a pair of ignitrons 82 and 83 connected in inverse parallel between the supply lines 1 and 2 through the primary winding of a welding transformer 84 whose secondary winding 85 is connected to a pair of welding electrodes 86. The electrodes 86 are relatively movable in response to the energization of an electromagnetic coil to be subsequently explained. Between lines 6 and 9 are disposed serially connected resistors 87 and 88 and the junction therebetween is connected through rheostat 89 to capacitor 50.

Secondary winding 63 of transformer 61 is connected between the shield grid 91 of an electronic tube 92 and line 28 through a condenser 93. Between lines 9 and 28 are disposed serially connected resistors 94 and 95 and the junction point therebetween is connected to shield grid 91 through rheostat 96. The cathode 97 of tube 92 is connected to line 28 and the control grid 98 is connected thereto by parallel circuits comprised of capacitor 99 and rectifier 101. The anode 102 of tube 92 is connected through capacitor 103 to line 5 and also to the control grid 104 of an electronic tube 105.

Across the lines 5 and 9 are disposed serially connected resistors 106 and 107 and the junction point therebetween is connected to control grid 104 through a rheostat 108 and the contacts 109 of a double pole, double throw switch indicated generally at 111. The cathode 112 of tube 105 is connected to line 5 and through contacts 113 of switch 111 to screen grid 114 of tube 105. The anode 115 of tube 105 is connected to one terminal of an energizing coil 116 for a control relay indicated generally at 117 and including normally closed contacts 15 and 37 and normally open contacts 25, 118 and 119. The other terminal of operating coil 116 is connected to one terminal of the secondary 121 of transformer 122, the other terminal of secondary 121 being connected to the cathode 112 of tube 105. The primary winding of transformer 122 is energized through an initiating switch 123 by a control circuit transformer 124 connected across lines 1 and 2. Initiating contact 123 is paralleled by normally open holding contact 119 on the control relay 117. The capacitor 125 is connected in parallel with the operating coil 116 to prevent chattering of the relay 117.

Normally open contacts 118 on the relay 117 operate to connect a solenoid valve coil 126 across lines 1 and 2. Energization of the coil 126 operates the associated valve to control pneumatic apparatus for effecting movement of the welding electrodes 86 in conventional manner.

Anode 115 of tube 105 is connected to the midpoint between resistors 106 and 107 through serially connected resistors 127 and 128 and capacitor 129. The junction between capacitor 129 and resistor 128 is connected to one pole of the switch 111 and the junction between resistors 127 and 128 is connected to the other pole of switch 111. A double pole switch indicated generally at 131 is provided, one pole of which, comprised by contacts 132, is in shunt with rheostat 33 and the other pole of which, comprised of contacts 133, is in shunt with rheostat 58.

In the above description of the diagrammatic representation shown in the drawing, certain conventional elements such as pressure switches, cathode heating elements, flow switches, etc. are omitted inasmuch as the position and operation of these and similar elements are well known to those familiar with the art, the omission being made for purposes of simplification of the description.

In the following list there is given an example of one set of component values useful in the construction of the system of this invention. Obviously these values may vary over a wide range and different combinations may be selected and utilized within the invention's scope.

Resistors:
```
11 _____ 120 K ohms.
12 _____ 27 K ohms.
16 _____ 27 K ohms.
24 _____ 5 K ohms.
26 _____ 22 Meg-ohms.
32 _____ 2.7 K ohms nominal.
36 _____ 4.7 Meg-ohms.
44 _____ 2.7 K ohms nominal.
46 _____ 390 K ohms.
47 _____ 150 K ohms.
56 _____ 680 K ohms.
57 _____ 82 K ohms nominal.
69 _____ 4.7 Meg-ohms.
75 _____ 500 Ohms.
87 _____ 12 K ohms.
88 _____ 3.3 K ohms nominal.
94 _____ 270 K ohms.
95 _____ 27 K ohms.
106 _____ 27 K ohms.
107 _____ 470 K ohms.
127 _____ 120 K ohms.
128 _____ 180 K ohms.
```

Capacitors:
```
8 _____ 20 Mfd.
17 _____ 0.5 Mfd.
27 _____ 0.001 Mfd.
34 _____ 2 Mfd.
41 _____ 0.0005 Mfd.
50 _____ 0.35 Mfd.
62 _____ 0.5 Mfd.
71 _____ 0.0005 Mfd.
93 _____ 0.5 Mfd.
99 _____ 0.01 Mfd.
103 _____ 0.35 Mfd.
125 _____ 8.0 Mfd.
129 _____ 0.05 Mfd.
```
Rheostats: 13, 33, 58, 89, 96, 108__ 2 Meg-ohms.
Tubes: 19, 35, 51, 65, 92, 105_____ 2050.
Rectifiers:
```
7 _____ 65 ma., 160 v. A. C.
14 _____ 20 ma., 130 v. A. C.
45 _____ 20 ma., 130 v. A. C.
101 _____ 5 ma., 130 v. A. C.
```

In the operation of the system, the squeeze time of the weld is controlled by rheostat 13; the weld interval time is controlled by rheostat 33; heat time is controlled by rheostat 89; cool time is controlled by rheostat 58; hold time is controlled by rheostat 96; and off time is controlled by rheostat 108. The switch 111 determines whether the system will operate with repeat or non-repeat characteristics and the switch 131 determines whether a single impulse or multi-impulse (pulsation) welding will be utilized.

When the main supply lines 1 and 2 are connected to a suitable source of electrical energy, and before the closure of the initiating switch 123, an A. C. voltage will appear between lines 1 and 2 while a D. C. voltage will appear between lines 9 and 6. Inasmuch as the contacts 118 are open, the solenoid coil 126 is deenergized and the welding electrodes 86 are consequently separated. Squeeze time capacitor 17 is charged through resistor 16 and rectifier 14 and normally closed contacts 15 of relay 117. Weld interval capacitor 34 is charged through resistors 24 and 32 and the normally closed contact 37 before relay 117 picks up and is charged through resistors 24 and 32 and rheostat 33 during the squeeze timing period.

When the initiating switch 123 is closed, the primary of transformer 122 is energized so that secondary winding 121 applies voltage between the anode and cathode of tube 105 which thereby conducts to energize the coil 116 of relay 117. Operation of relay 117 closes contacts 25, 118, 119 and opens contacts 15 and 37. With the opening of contacts 15, the grid 18 of tube 19 is dropped negative by the charge on condenser 17 to prevent conduction. This charge is dissipated through resistors 11 and 12 and rheostat 13 until tube 19 conducts, assuming that the pressure switch, where used, has closed. Capacitor 27 supplies a synchronizing voltage to the shield grid 22 of tube 19 which permits tube 19 to start conduction only during positive half cycles of the control voltage. Rectifier 14 prevents the discharge of condenser 17 should contacts 15 and 25 be momentarily closed at the same time. Closing of contacts 118 by the relay 117 energizes solenoid valve coil 126 to supply pressure to the welding electrodes to press them against the work.

Before tube 19 conducts, tube 35 grid and anode are negative to the cathode and therefore tube 35 cannot conduct. When tube 19 conducts on a synchronizing pulse, the cathode 38 of tube 35 is dropped negative relative to the grid 30 which is maintained by the charge on capacitor 34. With the grid 30 thus maintained positive relative to the cathode 38, tube 35 starts conducting as the voltage of its anode 42 becomes positive to thereby energize the primary of transformer 43 and also to apply a voltage to grid 98 to hold off tube 92. The charge on capacitor 34 is dissipated through rheostat 33 and the parallel path; resistance 32 or resistance 44, rectifier 45, winding 29 and the anode of tube 19. When the charge on capacitor 34 is sufficiently low, the tube 35 is cut off to end the weld interval time. It is to be noted that the synchronizing voltage fed to the cathode 38 of tube 35 is phase-shifted by resistance 36 and capacitor 41 so as to allow tube 35 to conduct only at the beginning of each positive half cycle of voltage at the anode 42. A D. C. hold off voltage is supplied to the grid 30 of tube 35 through resistances 32 and 44, rectifier 45 and secondary winding 29.

While tube 35 is conducting, the voltage divider formed by resistances 46 and 47 supplies a hold off voltage to the grid 98 of tube 92 and supplies a positive firing signal to tube 92 when tube 35 cuts off. The heat time, the timing of one current impulse in pulsation welding, is controlled by tube 65, the energization of which is effected by tube 51 which controls the cool time in pulsation welding. Before tube 35 conducts, the grid 59 of tube 51 is ready to conduct when transformer 43 is energized. Since the conduction of tube 35 energizes the primary of transformer 43, tube 51 will conduct when tube 35 conducts and will charge capacitor 50 through tube 19. The grid 68 of tube 65 becomes positive with respect to its cathode 66, and tube 65 conducts when its anode becomes positive, thus energizing relay 77 and transformer 61 through main relay coil 74 and transformer primary 64 respectively. Secondary winding 60 of transformer 61 supplies pulses to charge capacitor 62 through grid 59 of tube 51 on the polarity when the anode 49 is negative. Hence, after one-half cycle of conduction, tube 51 is cut off by the charge on capacitor 62.

Energization of main relay coil 74 operates the relay 77 to close contacts 79 and initiate conduction of the ignitron contactor 81. Ignitron 82 will always fire first and will always be followed by ignitron 83. The auxiliary winding 78 of relay 77 is energized by a low voltage section on transformer 53 and this not only serves to prevent chattering, but also holds the relay closed a full cycle for each half cycle that tube 65 conducts and thereby ensures that an even number of half cycles of welding current will always be passed through the weld.

The grid 68 of tube 65 becomes less and less positive as the charge on capacitor 50 is dissipated through resistors 87 and 88 and rheostat 89. Finally, tube 65 is cut off, thus deenergizing relay 77 and transformer 61. It is noted that tube 65 will start conducting only at the beginning of each positive half cycle due to the feeding of its grid 68 by the synchronizing voltage phase-shifted by resistor 69 and capacitor 71.

For pulsation operation, the switch 131 is in the position illustrated in the drawing with contacts 132 and 133 open. In this operation, after tube 65 cuts off, the grid 59 of tube 51 becomes less and less negative as the charge on capacitor 62 is dissipated through resistors 56 and 57 and rheostat 58. If the weld interval has not finished timing when grid 59 becomes positive, that is if tube 35 is still conducting, tube 51 will again conduct one pulse of transformer 43 voltage to again charge capacitor 50 and start another heat time by conduction of tube 65 as previously explained. Thereafter, the sequence is repeated with heat times alternating with cool times until the weld interval times out by the cutting off of tube 35.

During the weld interval time, while tube 35 is conducting, the grid 98 of tube 92 is held negative. At the end of the weld interval time when tube 35 ceases conducting, the grid is released and tube 92 prepares to conduct. While tube 65 is conducting, the secondary winding 63 of transformer 61 charges capacitor 93 through shield grid 91 of tube 92 on the polarity when anode 102 is negative. After the last heat time shield grid 91 becomes less and less negative as the charge on capacitor 93 is dissipated through resistors 94, 95 and rheostat 96. When the shield grid 91 approaches zero, tube 92 conducts and charges off time capacitor 103. Tube 92 conducts through tube 19 and transformer 3.

Regardless of when the weld interval times out and tube 35 stops conducting, the hold time will always follow a heat time since tube 92 can conduct only after capacitor 93 discharges after tube 65 stops conducting. Thus, the hold time is independent of cool time setting and the adjustment thereof through rheostat 96 is independent of the setting of rheostat 58. Any time that tube 35 is conducting when capacitor 62 is discharged, tube 51 conducts to initiate conduction of tube 65 to start another heat time. Hence, after tube 65 cuts off either a hold time will be initiated with the cessation of firing of the electron contactor or another heat time will be added if the anode of tube 51 is energized from transformer 43.

During squeeze, weld interval, heat, cool and hold times, the voltage divider formed by resistors 106 and 107 provides a positive potential to the grid 104 of tube 105 and tube 105 conducts, being energized from transformer 122. Conduction of tube 92 charges capacitor 103 to render grid 104 negative to stop conduction of tube 105. The operating coil 116 of relay 117 is therefore deenergized and the relay drops out to begin off timing. Contacts 25, 118 and 119 open with contact 25 cutting off conduction of tube 19 and therefore of tube 92. Opening of contact 118 deenergizes solenoid valve coil 126 and releases pressure on electrodes 85 and 86 which therefore move apart to release the work. Contacts 15 and 37 close to recharge squeeze time and weld interval capacitors 17 and 34 respectively. When tube 92 stops conducting, off time capacitor 103 begins to discharge through resistors 106, 107 and rheostat 108 until tube 105 reconducts, providing the initiating switch has been held closed and the switch 111 is in the repeat position illustrated in the drawing.

If the switch 111 is in the non-repeat position opposite that shown in the figure, rheostat 108 is replaced by resistance 127 and the grid 104 is connected to the shield grid 114 by resistance 128. Also, the shield grid 114 is connected to the plate supply rather than to the cathode. Now, if the initiating contact 123 is held closed at the end of the weld cycle, after tube 105 is cut off, the shield grid 114 serves as a half-wave rectifier which is filtered by resistance 128 and capacitor 103 and appears as a D. C. voltage on grid 104 which is sufficiently negative to prevent tube 105 conducting. If initiating contact 123 is thereafter released, the negative voltage of capacitor 103 is quickly bled off through resistors 106, 107 and 127 and tube 105 is then ready to conduct when initiating switch 123 is again closed.

If switch 131 is moved to the single impulse weld control position opposite that shown in the figure, rheostats 33 and 58 are shunted out and the system will supply a single impulse through the weld timed by the setting of the rheostat 89. Therefore, in effect, the weld interval time becomes the heat time and there is no cool time since only a single heat time occurs.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. In a welder control system for electrically welding work by passing current therethrough between electrodes pressed thereagainst, the combination comprising; means including a first electronic tube for controlling an overall weld time interval by conduction of said first electronic tube, means including a second electronic tube for controlling the length of individual heating periods within said overall interval by conduction of said second electronic tube, during which heating periods current is passed through the work, means including a third electronic tube for controlling the cooling interval between successive heating periods within the overall weld time interval by conduction of said third electronic tube, and means operative with said last mentioned controlling means for insuring the ending of the overall weld time interval with a heating period.

2. In a welder control system for electrically welding work by passing current therethrough between electrodes pressed thereagainst, the combination comprising; means including a first electronic tube for controlling an overall weld time interval by conduction of said first electronic tube, means including a second electronic tube for controlling the length of individual heating periods within the said overall interval by conduction of said second electronic tube, during which heating periods current is passed through the work, means including a third electronic tube for controlling the cooling interval between successive heating periods within the overall weld time interval by conduction of said third electronic tube, and means including a fourth electronic tube for controlling the hold time of the welding cycle while the electrodes are maintained pressed against the work without passage of current by conduction of said fourth electronic tube, said fourth electronic tube being circuited with said first tube for being maintained non-conductive by the conduction of said first electronic tube.

3. In a welder control system for electrically welding work by passing current therethrough between electrodes pressed thereagainst, the combination comprising; means including a first electronic tube for controlling an overall weld time interval by conduction of said first electronic tube, means including a second electronic tube for controlling the length of individual heating periods within the overall interval by conduction of said second electronic tube, during which heating periods current is passed through the work, means including a third electronic tube for controlling the cooling interval between successive heating periods within the overall weld time interval by conduction of said third electronic tube, means operative with said last mentioned means for insuring the ending of the overall weld time interval with a heating period, and means including a fourth electronic tube for controlling the hold time of the welding cycle while the electrodes are maintained pressed against the work without the passage of current by conduction of said fourth electronic tube, said fourth electronic tube being circuited with said first tube for being maintained non-conductive by conduction of said first electronic tube.

4. In a welder control system for electrically welding work by passing current therethrough between electrodes pressed thereagainst, the combination comprising a first electronic tube, means controlling the conduction of said first electronic tube to establish an overall weld time interval, a second electronic tube, means controlling the conduction of said second electronic tube to establish the length of individual heating periods within the overall weld time interval, during which heating periods current is passed through the work, a third electronic tube, means controlling the conduction of said third electronic tube to establish a cooling interval between successive heating periods within the overall weld time interval, and means whereby failure of said first electronic tube and the means for controlling associated therewith will terminate the flow of welding current at the next end of a heating period.

5. In a welder control system for electrically welding work by passing current therethrough between electrodes pressed thereagainst, the combination comprising a first electronic tube, means for controlling the conduction of said first electronic tube to establish an overall weld time interval, a second electronic tube, means for controlling the conduction of said second electronic tube to establish individual heating periods of predetermined length within the overall weld time interval during which heating periods current is passed through the work, a third electronic tube, means for controlling conduction of said third electronic tube to establish a predetermined cooling interval between successive heating periods within the overall weld time interval, a fourth electronic tube, means for controlling the conduction of said fourth electronic tube to establish a predetermined period during which the electrodes are pressed against the work after current flow ceases entirely, and means for rendering said fourth electronic tube conductive a predetermined interval after the termination of conduction of both said first and second electronic tubes.

6. In a welder control system for electrically welding work by passing current therethrough between electrodes pressed thereagainst, the combination comprising; a first electronic tube, means for controlling the conduction of said first electronic tube to establish an overall weld time interval, a second electronic tube, means for controlling the conduction of said second electronic tube to establish individual heating periods of predetermined length within the overall interval during which heating periods current is passed through the work, a third electronic tube, means for controlling the conduction of said third electronic tube to establish a cooling interval between successive heating periods within the overall weld time interval, means operative with said last mentioned controlling means for insuring the ending of the overall weld time interval with a heating period, a fourth electronic tube, means for controlling the conduction of said fourth electronic tube to establish the period the electrodes are pressed against the work after the current flow ceases entirely, and means for rendering said fourth electronic tube conductive a predetermined interval after the termination of conduction of both said first and second electronic tubes.

7. In a welder control system for electrically welding work by passing current therethrough between electrodes pressed thereagainst the combination comprising, a first electronic tube controlling an overall weld time interval, a first charge storing means adapted to be charged in response to current flow through said first electronic tube, a second electronic tube controlling the length of individual heating periods within the overall interval during which heating periods current is passed through the work, said second electronic tube being conditioned for conduction by said first charge storing means, a third electronic tube controlling the cooling interval between successive individual heating periods, a second charge storing means associated with said third electronic tube and charged in response to current flow therethrough, said second charge storing means being conditioned for such charging by periods of current flow through said second electronic tube, said first charge storing means discharging to determine the duration of each conduction period of said second electronic tube, said second charge storing means discharging to determine the timing of repeated rechargings of said first charge storing means and thereby repeat conduction periods of said second electronic tube, and the conduction condition of said first electronic tube controlling the repeated charging of said first and therewith said second charge storing means to establish the overall welding control cycle.

References Cited in the file of this patent

UNITED STATES PATENTS

| | | |
|---|---|---|
| 2,111,013 | Vedder | Mar. 15, 1938 |
| 2,190,514 | Garman | Feb. 13, 1940 |
| 2,303,453 | Gulliksen | Dec. 1, 1942 |
| 2,329,090 | Smith | Sept. 7, 1943 |
| 2,411,708 | Bivens | Nov. 26, 1946 |
| 2,518,118 | Bivens | Aug. 8, 1950 |
| 2,590,582 | Stadum | Mar. 25, 1952 |
| 2,623,146 | Anger | Dec. 23, 1952 |
| 2,653,209 | Hartwig | Sept. 22, 1953 |
| 2,710,326 | Collom | June 7, 1955 |
| 2,725,472 | Hartwig | Nov. 29, 1955 |